(12) United States Patent
Cash, III et al.

(10) Patent No.: US 7,360,640 B2
(45) Date of Patent: Apr. 22, 2008

(54) LOCKING MECHANISM FOR SECURING A MEMBER TO A CONVEYOR

(75) Inventors: John W. Cash, III, Dallas, GA (US); Keenan W. Haley, Austell, GA (US)

(73) Assignee: MeadWestvaco Packaging Systems, LLC, Glen Allen, VA (US)

( * ) Notice: Subject to any disclaimer, the term of this patent is extended or adjusted under 35 U.S.C. 154(b) by 0 days.

(21) Appl. No.: 11/537,090

(22) Filed: Sep. 29, 2006
(Under 37 CFR 1.47)

(65) Prior Publication Data
US 2007/0181404 A1    Aug. 9, 2007

Related U.S. Application Data

(60) Provisional application No. 60/722,818, filed on Sep. 30, 2005.

(51) Int. Cl.
*B65G 15/44* (2006.01)
(52) U.S. Cl. .................. 198/699; 198/851; 198/731
(58) Field of Classification Search ............ 198/690.2, 198/698, 699, 731, 850–853
See application file for complete search history.

(56) References Cited

U.S. PATENT DOCUMENTS

| | | | |
|---|---|---|---|
| 4,170,281 A | 10/1979 | Lapeyre | |
| 4,582,193 A | 4/1986 | Larsson | |
| 4,832,183 A * | 5/1989 | Lapeyre | ............ 198/699 |
| 5,101,966 A | 4/1992 | Lapeyre | |
| 5,247,789 A * | 9/1993 | Abbestam et al. | ......... 198/851 |
| 5,429,226 A | 7/1995 | Ensch et al. | |
| D381,176 S | 7/1997 | Patois et al. | |
| 6,176,370 B1 | 1/2001 | Davies | |
| 6,321,904 B1 | 11/2001 | Mitchell | |
| 6,467,610 B1 | 10/2002 | MacLachlan | |
| 6,554,129 B2 | 4/2003 | Straight et al. | |
| 6,695,135 B1 | 2/2004 | Lapeyre | |
| 6,766,901 B2 | 7/2004 | Guldenfels et al. | |
| 6,772,876 B2 | 8/2004 | Spangenberg | |
| 6,827,204 B2 | 12/2004 | Cribiu' | |
| 2004/0112714 A1 | 6/2004 | Davaillon | |
| 2004/0144627 A1 | 7/2004 | Trebbi et al. | |
| 2004/0222073 A1 | 11/2004 | Oreste | |

* cited by examiner

*Primary Examiner*—James R. Bidwell

(57) ABSTRACT

A locking mechanism is provided for releasably securing a grouper lug to a conveyor plate in a packaging machine conveyor belt assembly. The locking mechanism includes a cantilever arm that is disposed in a base wall of the grouper lug which defines a locking surface. The cantilever arm is defined by a channel that is formed in the base wall. A detent is disposed at the distal end of the cantilever arm and protrudes from the locking surface. An elongated key is integral to the base wall of the grouper lug and can be slidably received by a groove that is integral to the conveyor plate. The conveyor plate includes an aperture or depression that receives the detent to releasably secure the grouper lug to the conveyor plate.

19 Claims, 2 Drawing Sheets

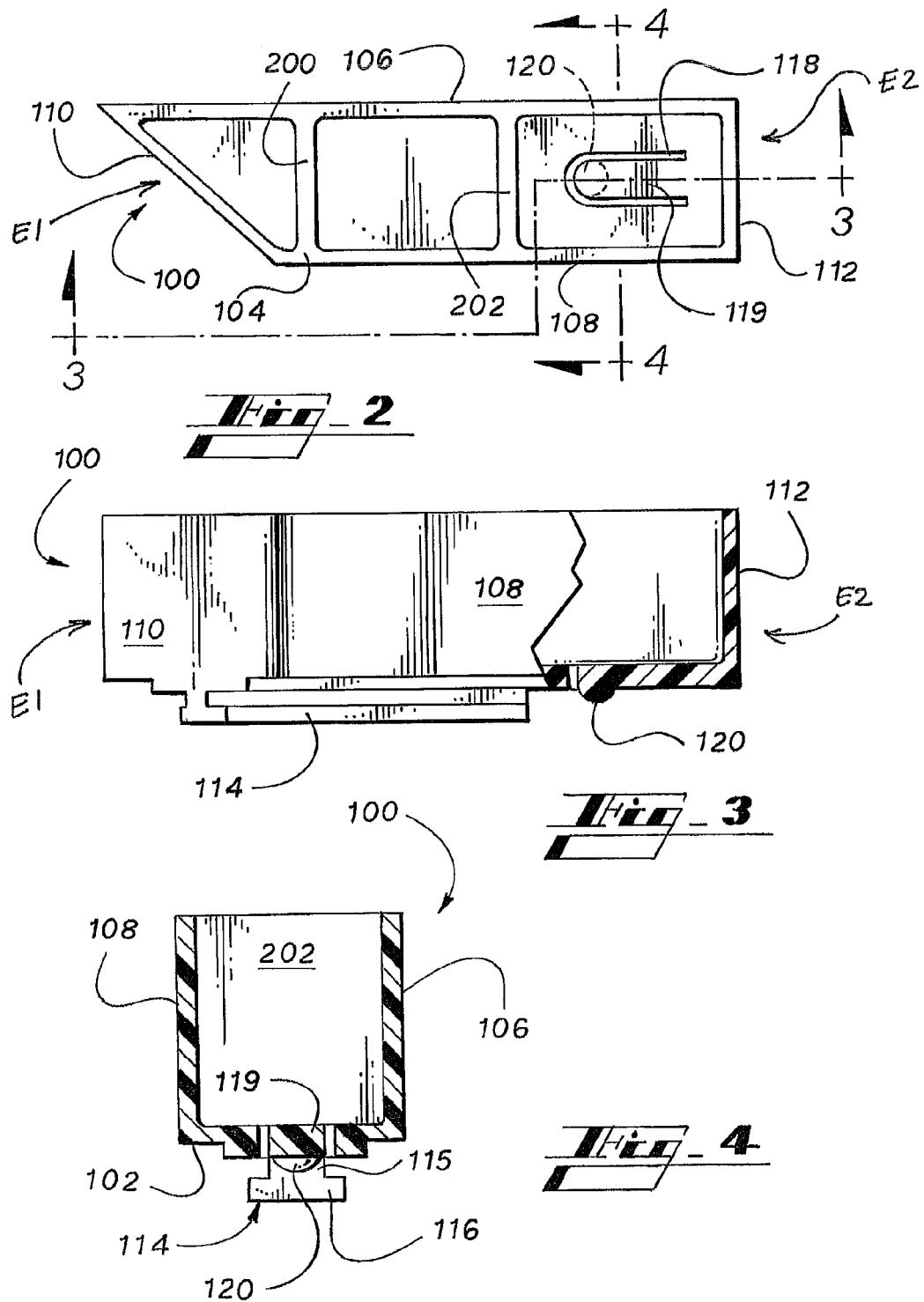

LOCKING MECHANISM FOR SECURING A MEMBER TO A CONVEYOR

CROSS REFERENCE TO RELATED APPLICATION

This application claims priority to U.S. Application No. 60/722,818, filed Sep. 30, 2005 and entitled "Grouper Lug Detent," the entirety of which is incorporated herein by reference.

TECHNICAL FIELD

This invention is generally related to conveying systems in packaging machines, and more particularly, to an improved locking mechanism for detachably securing an article engaging member to a conveyor plate.

BACKGROUND OF THE INVENTION

Conveyors with attached article engaging members, such as metering or grouper lugs, are often used in a packaging machine to transport articles, such as bottles or cans, and separate the articles into groups that are then loaded into cartons. There are many instances when it is necessary to stop the conveyor to remove lugs, add lugs, change the spacing between lugs, and/or change the position of lugs. For example, if a lug is damaged during operation, the conveyor is stopped so that the damaged lug can be removed and replaced. As another example, the conveyor is stopped to change the spacing between lugs in order to configure the conveyor for certain packaging applications that include differently sized groups and/or differently sized articles.

In high-speed production processes, downtime is a significant economic concern. Thus, the time involved in removing a grouper lug from a conveyor and securing a grouper lug to a conveyor is significant. It is therefore advantageous to utilize a grouper lug that can be attached to and detached from the conveyor quickly and consistently.

The conveyor includes a series of conveyor plates that are attached to a conveyor chain. The conveyor plates provide a flat surface upon which articles are conveyed. A lug and a conveyor plate can be designed to work together such that each includes elements of a locking mechanism that allows the lug to be releasably secured or detachably mounted to the conveyor plate. Existing designs of such a locking mechanism include multiple parts that are costly, require assembly, and tend to fail.

Therefore, a heretofore unaddressed need exists in the industry to address the aforementioned deficiencies and inadequacies. What is needed is an improved locking mechanism for quickly and easily securing a detachable engaging member, such as a lug, to a conveyor. The locking mechanism should be cost effective to manufacture and not prone to failure.

SUMMARY OF THE INVENTION

The various embodiments of the present invention overcome the shortcomings of the prior art by providing a locking mechanism for securing a lug or other article engaging member to a conveyor plate. Elements of the exemplary locking mechanism are integrally formed as part of the engaging member such that the cost of the locking mechanism is reduced and the functionality of the locking mechanism is improved. Specifically, no additional materials or manufacturing steps are required, no assembly is necessary, and the risk of mechanical failure of the locking mechanism is mitigated.

The exemplary grouper lug and the conveyor plate include elements that matingly and slidingly engage one another such that the article engaging member can be slidingly received by the conveyor plate. In the exemplary embodiment, the grouper lug includes a male element, such as an elongated key, and the conveyor plate includes a female element, such as a groove, that can slidingly receive the male element. However, in alternative embodiments, the grouper lug includes a groove and the conveyor plate includes a key such that the article engaging member and the conveyor plate can slidingly engage one another.

The grouper lug and the conveyor plate also include elements of a locking mechanism that releasably engage one another to detachably secure the article engaging member to the conveyor plate after the article engaging member has been slidingly received by the conveyor plate. An exemplary locking mechanism includes an inwardly deflectable cantilever arm that is formed from a portion of the grouper lug that defines a locking surface of the grouper lug. In the exemplary embodiment, the cantilever arm is defined by a channel that is formed in a base wall of the grouper lug such that the locking surface of the grouper lug is defined by the base wall. It should be understood that, when the grouper lug is slidingly received by or properly seated on a conveyor plate, the locking surface of the grouper lug is in contact with a corresponding contact surface of the conveyor plate, and that the corresponding contact surface is defined by a portion of the conveyor plate that includes cooperating elements of the locking mechanism.

A detent is formed on the cantilever arm and protrudes from the locking surface. The detent is dimensioned and positioned so as to be received by means for receiving the detent, which is formed in the portion of the conveyor plate that defines the corresponding contact surface that is in contact with the locking surface of the grouper lug, such that the grouper lug can be releasably secured to the conveyor plate. Examples of suitable means for receiving include, but are not limited to, a depression, an aperture, a groove, a slot, combinations thereof, and the like. In alternative embodiments, the cantilever arm and detent can be formed in the portion of the conveyor plate that defines a corresponding contact surface and the portion of the grouper lug that defines the locking surface can include means for receiving the detent such that the grouper lug can be releasably secured to the conveyor plate.

At the point of this engagement, the grouper lug is secured in its proper position on the conveyor plate. The grouper lug can be removed by providing a force primarily in the longitudinal direction to disengage the detent from the aperture and slide the key out of the groove.

The foregoing has broadly outlined some of the aspects and features of the present invention, which should be construed to be merely illustrative of various potential applications of the invention. Other beneficial results can be obtained by applying the disclosed information in a different manner or by combining various aspects of the disclosed embodiments. Accordingly, other aspects and a more comprehensive understanding of the invention may be obtained by referring to the detailed description of the exemplary embodiments taken in conjunction with the accompanying drawings, in addition to the scope of the invention defined by the claims.

BRIEF DESCRIPTION OF THE DRAWINGS

FIG. 2 is a plan view of the grouper lug of FIG. 1.

FIG. 3 is a side elevation view of the grouper lug of FIG. 1 that is cut away along the line 3-3 in FIG. 2.

FIG. 4 is an end elevation view of the grouper lug of FIG. 1 that is cut away along the line 4-4 in FIG. 2.

DETAILED DESCRIPTION

Figure 1:
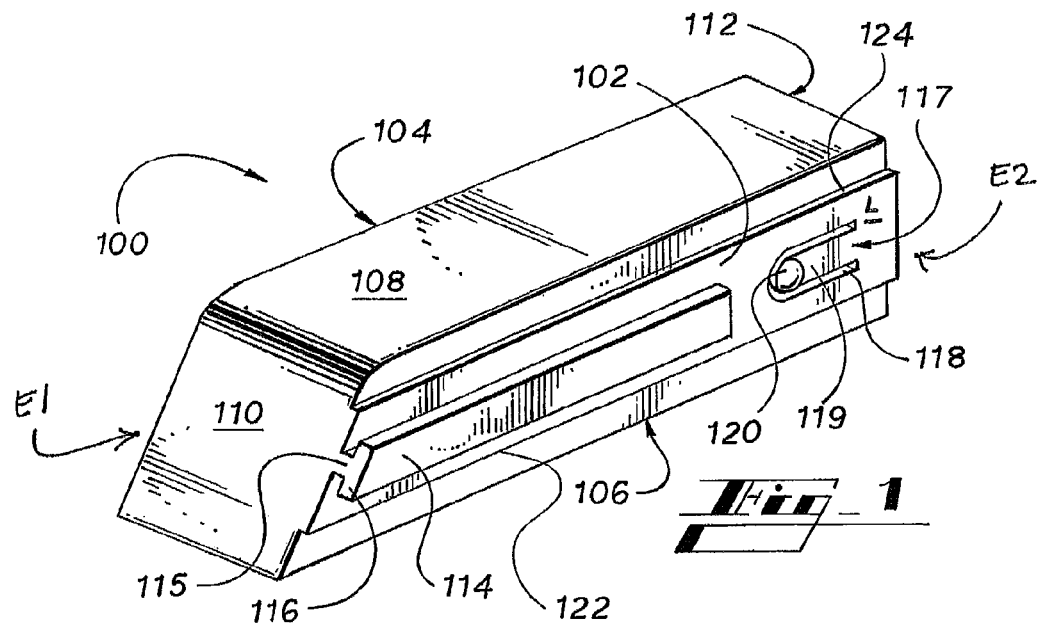
FIG. 1 is a perspective view of a grouper lug that includes an exemplary locking mechanism according to the present invention.

As required, detailed embodiments of the present invention are disclosed herein. It must be understood that the disclosed embodiments are merely exemplary of the invention that may be embodied in various and alternative forms, and combinations thereof. As used herein, the word "exemplary" is used expansively to refer to embodiments that serve as illustrations, specimens, models, or patterns. The figures are not necessarily to scale and some features may be exaggerated or minimized to show details of particular components. In other instances, well-known components, systems, materials, or methods have not been described in detail in order to avoid obscuring the present invention. Therefore, specific structural and functional details disclosed herein are not to be interpreted as limiting, but merely as a basis for the claims and as a representative basis for teaching one skilled in the art to variously employ the present invention.

Referring now to the drawings, wherein like numerals indicate like elements throughout the several views, the drawings illustrate certain of the various aspects of an exemplary embodiment of a locking mechanism that facilitates securing a slidingly engaged article engaging member, which in the exemplary embodiments is a grouper lug, to a conveyor plate. The teachings of the present invention are easily applied to any known or yet to be developed article engaging member or other conveying attachments, including metering lugs, carton conveyor lugs, and the like.

Referring to FIG. 1, a perspective view of an exemplary grouper lug 100 is shown. The grouper lug 100 has a unitary body that can be molded or machined from plastic. It is contemplated that, in alternative embodiments, any system or method and any material can be used to form a grouper lug having the elements and functionality described herein.

The illustrated grouper lug 100 has a generally trapezoidal horizontal cross section, as shown in FIG. 2, although the grouper lug can have many different cross-sectional shapes including, but not limited to, a rectangle, triangle, and a semi-circle that can provide the necessary functionality in grouping products. It should be understood that the size and shape of the grouper lug are design decisions that are at least partially dependent on the packaging application. Further, it should be noted that the illustrated grouper lug is provided for purposes of teaching and not limitation. The locking mechanism described herein is adaptable to any engaging member that is secured to a conveyor.

Referring to FIGS. 1 through 4, the exemplary grouper lug 100 has a trough-like structure defined by walls including a base wall 102, a front wall 106, a rear wall 108, a first end wall 110, and a second end wall 112. The base wall 102 has a substantially elongated trapezoidal shape with a first end that tapers. The walls 106, 108, 110, 112 extend substantially vertically from the horizontal plane defined by the base wall 102 and each wall 106, 108, 110, 112 corresponds to an edge of the base wall 102. The front and rear walls 106, 108 are substantially parallel to one another, the second end wall 112 is substantially perpendicular to the front and rear walls 106, 108, and the first end wall 110 forms an acute angle with respect to the planes defined by each of the front and rear walls 106, 108. Thereby, a first end E1 of the grouper lug 100 is tapered. Tapering the first end E1 of the grouper lug 100 is useful in certain packaging applications for separating articles into groups. However, as mentioned above, the grouper lug 100 can have any suitable size or shape. It should be noted that, in place of tapering, alternative means for gradually decreasing the width of the lug may be used, including a curved or stepped surface, depending on the application.

In the embodiment shown, the base wall 102 is optionally raised to define a first edge 122 and a second edge 124. The raised portion of the base wall 102 provides a stable connection, while minimizing the friction between the grouper lug 100 and a conveyor plate.

Referring to FIGS. 1 through 4, the base wall 102 includes a key 114 such that the grouper lug 100 can be slidingly received by a conveyor plate, as described in further detail below. The key 114 is molded or machined so as to be integral to the grouper lug 100. However, in alternative embodiments, the key 114 can be attached to the base wall 102. The cross section of the key 114, as shown in FIG. 4, is substantially, but not necessarily, T-shaped so as to include a neck 115 that extends substantially perpendicularly from the base wall 102 and a flange 116 that is disposed at the distal end of the neck 115. In the exemplary embodiment, the key 114 is centered with respect to the width of the base wall 102 and aligned in the longitudinal direction of the base wall 102. The key 114 extends from the first end wall 110 toward the second end wall 112.

Figure 5:
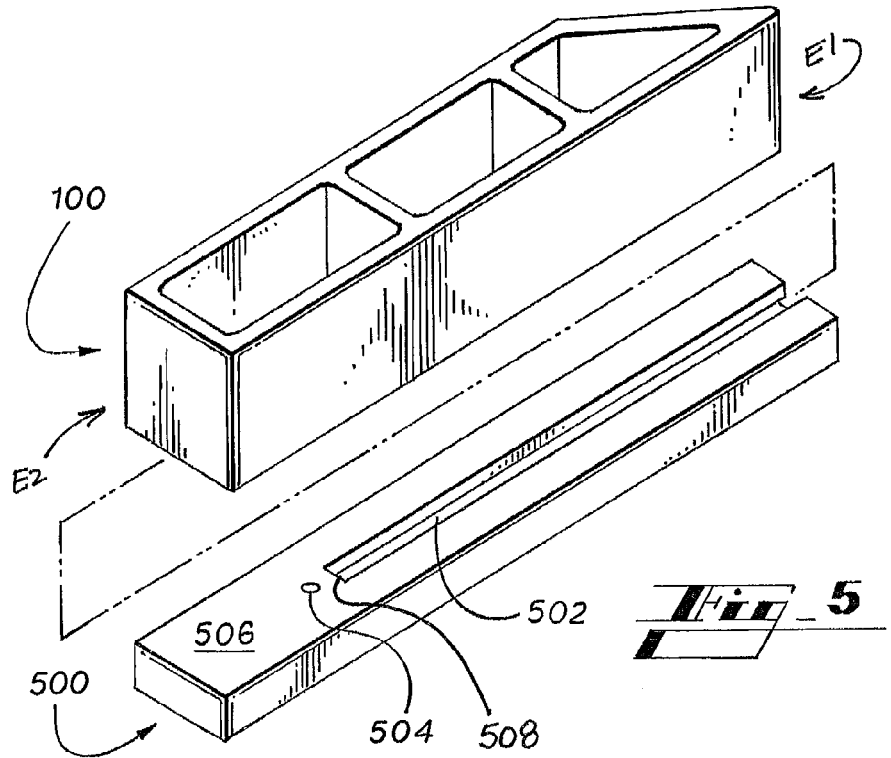
FIG. 5 is a perspective view of a mounting plate and the grouper lug of FIG. 1.

The base wall 102 includes elements of a locking mechanism 117 to secure the grouper lug 100 to a conveyor plate 500, as shown in FIG. 5. Referring to FIGS. 1-4, the locking mechanism 117 includes a flexible or flexibly connected cantilever arm 119 that is defined by a channel 118 and a detent 120 or bump that is disposed at the distal end of the cantilever arm 119. The exemplary channel 118 is substantially U-shaped, although many variations could be used including, but not limited to, a squared U-shape, a V-shape, or any other shape that defines the cantilever arm 119 such that the cantilever arm can be displaced from the plane of a locking surface S defined by the base wall 102. The channel 118 fully extends through the base wall 102 to completely separate the distal end of the cantilever arm 119 from the base wall 102. Thereby, the distal end of the cantilever arm 119 can displace inwardly and outwardly with respect to the plane of the base wall 102 as defined by the locking surface S. In alternative embodiments, elements of the locking mechanism 117 can be integral to the key 114 such that the key 114 defines the locking surface S. In fact, it is contemplated that elements of the locking mechanism 117 can be formed in any portion or wall of the grouper lug 100 that defines a locking surface S which contacts a corresponding contact surface of the conveyor plate 500. Additionally, corresponding elements of the locking mechanism 117 can be formed in any portion or wall of the conveyor plate 500 that defines a corresponding contact surface that contacts the locking surface S of the grouper lug 100 as the grouper lug 100 is slidingly received by the conveyor plate 500.

In the exemplary embodiment, the cantilever arm 119 is aligned with the key 114, as best shown in FIG. 4. However, in alternative embodiments, the key 114 and elements of the locking mechanism 117 on the grouper lug 100 can be dimensioned and positioned as necessary to cooperate with elements of the locking mechanism 117 on the conveyor plate 500, as described in further detail below. For example, in certain embodiments, the key 114 extends the entire length of the grouper lug 100 and elements of locking mechanism 117 are adjacent to the key 114. In additional alternative embodiments, the key 114 is offset from the center of the base wall 102 and/or the key 114 extends diagonally along the length of the base wall 102.

The detent 120 is centered or otherwise positioned near the distal end of the cantilever arm 119 and protrudes or projects outwardly from the locking surface S of the base wall 102. The detent 120 has a substantially hemispherical shape. However, the shape of the detent 120 is a design decision wherein the shape of the detent 120 can be any shape that maintains the functionality of the locking mechanism 117 including a truncated cone or frustum structure, a cone, a peg, combinations thereof, and the like.

Referring to FIG. 2, it should be understood that the grouper lug 100 includes a cavity that is defined by the walls of the grouper lug 100. The cavity reduces the weight of the grouper lug 100 and the amount of material used to form the grouper lug 100 while maintaining the necessary dimensions and strength of the grouper lug 100. To provide structural integrity, first and second ribs 200, 202, each extending between the front and rear walls 106, 108, are formed in the cavity of the grouper lug 100. The ribs 200, 202 are positioned to provide structural stability without interfering with the movement of the cantilever arm 119. Those who are skilled in the art will understand that any number of ribs can be used in any suitable configuration to provide the necessary structural integrity.

It should be noted that its length, and the thickness and elasticity of the material that is used to form the cantilever arm 119 at least partially determine the amount that the distal end of the cantilever arm 119 will displace as a force is applied to the detent 120.

FIG. 3 is a side elevation view, partially cut away along the line 3-3, of the grouper lug 100 as viewed from the rear wall 108. The first end wall 110 is also visible because it is tapered. From this perspective, the relative length of the exemplary key 114 with respect to the base wall 102 and the distance that the detent 120 protrudes from the locking surface S of the base wall 102 can be appreciated.

FIG. 4 is an end elevation view, partially cut away along the line 4-4, of the grouper lug 100 as viewed from the second end E2. As mentioned above, the detent 120 is aligned with the key 114, and specifically, with neck 115 and the flange 116 of the key 114.

Referring to FIG. 5, an exemplary conveyor plate 500 is shown that is configured to slidingly receive the grouper lug 100. The conveyor plate 500 includes a groove 502 that is configured to receive the key 114 such that the grouper lug 100 can slide relative to the conveyor plate 500 in the longitudinal direction defined by the key 114 and the groove 502, and such that movement of the grouper lug 100 relative to the conveyor plate 500 in all other directions is restricted. The groove 502 may extend partially or completely through the conveyor plate 500. It should be understood that the exemplary groove 502 is substantially T-shaped in order to receive the T-shaped key 114 in a mating arrangement. The respective shapes of the key 114 and groove 502 can be any suitable configuration, including but not limited to an L-shape, a dovetail, a wedge, or any suitable shape that has a wider portion which is distal to a narrower portion.

The conveyor plate 500 further includes an aperture 504 that is disposed in a portion of the conveyor plate that defines an upper or corresponding contact surface 506 of the conveyor plate 500. The aperture 504 is positioned and dimensioned such that the detent 120 can be received and releasably engaged in the aperture 504, as described in further detail below. It should be understood that any suitable means for receiving the detent 120 can be substituted for the aperture including, but not limited to, a groove, a depression, a slot, a recess, combinations thereof, the like, or any other element that is suitable for releasably engaging the detent 120.

The grouper lug 100 can be secured to the conveyor plate 500 by arranging the grouper lug 100 such that the second end E2 is adjacent to the open end of the groove 502 and slidingly inserting the key 114 into the open end of the groove 502. As the key 114 is slidingly received in the longitudinal groove 502, the detent 120 comes into contact with the end wall 508 (partially obstructed) of the longitudinal groove 502, causing the cantilever arm 119 to inwardly displace until the bottom of the detent 120 clears the end wall. As the key 114 is further received in the longitudinal groove 502, the detent 120 is held in contact with the upper or corresponding contact surface 506 of the conveyor plate 500 by the cantilever arm 119 until the detent 120 comes into registry with and is received in the aperture 504. The cantilever arm 119 springs outwardly so that the detent 120 and the aperture 504 are thereby releasably engaged. The tendency of the cantilever arm 119 to resist displacement or deflection releasably locks the detent 120 in the aperture 504 and thereby the grouper lug 100 is releasably locked to the conveyor plate 500, with the relative positions of the locking surface S and the corresponding contact surface 506 fixed.

The grouper lug 100 is removed from the conveyor plate 500 by applying a force on the grouper lug 100 in the longitudinal direction toward the open end of the groove 502. The force on the grouper lug 100 forces the detent 120 against the wall or edge of the aperture 504 causing the cantilever arm 119 to deflect or displace until the detent 120 disengages from the aperture 504. The key 114 of the grouper lug 100 can then slide out of the groove 502 of the conveyor plate 500. It may also be necessary to simultaneously lift the grouper lug 100 somewhat away from the conveyor plate 100 to urge the detent 120 out of the aperture 504.

It must be emphasized that the present invention has been illustrated in relation to a particular embodiment, which is intended in all respects to be illustrative rather than restrictive. The exemplary conveyor plate is provided for purposes of teaching the various aspects of the lug and locking mechanism. Various sizes and shapes of plates and lugs can be used and are within the scope of the invention. The conveyor plate, lug, and any component thereof can be machined, injection molded, or fashioned using any system, method, and material. An example of other conveyor plates that may be used with the above-described grouper lug is disclosed in U.S. Provisional Patent Application No. 60/676,458, which is hereby incorporated by reference.

Those skilled in the art will recognize that the present invention is capable of many variations and combinations without departing from the scope of the claims appended hereto and supported by the foregoing. The above-described embodiments are merely exemplary illustrations of implementations set forth for a clear understanding of the principles of the invention. Variations, modifications, and combinations may be made to the above-described embodiments without departing from the scope of the claims. All such variations, modifications, and combinations are included herein by the scope of this disclosure and the following claims.

What is claimed is:

1. An apparatus for conveying articles, comprising:
an article engaging member;
a conveyor plate that defines a support surface for supporting said articles and slidingly receives said article engaging member which extends outwardly from said support surface to engage said articles; and
a locking mechanism for substantially fixing the position of the article engaging member relative to the conveyor plate, the locking mechanism comprising:
a displaceable cantilever arm;
a detent formed on the cantilever arm; and
means for receiving the detent;
wherein the cantilever arm and the detent are elements of one of said article engaging member and said conveyor plate, and the means for receiving the detent is an element of the other of said article engaging member and said conveyor plate.

2. A conveying apparatus, comprising:
an article engaging member;
a conveyor plate that slidingly receives said article engaging member; and
a locking mechanism for substantially fixing the position of the article engaging member relative to the conveyor plate, the locking mechanism comprising:
a displaceable cantilever arm;
a detent formed on the cantilever arm; and
means for receiving the detent;
wherein:
the cantilever arm and the detent are elements of one of said article engaging member and said conveyor plate, and the means for receiving the detent is an element of the other of said article engaging member and said conveyor plate;
the cantilever arm is inwardly displaceable with respect to a locking surface defined by said one of said article engaging member and said conveyor plate;
the detent extends outwardly beyond said locking surface when the detent is received by said means for receiving; and
said means for receiving is formed in a portion of said other of said article engaging member and said conveyor plate that defines a corresponding contact surface that is in contact with the locking surface as the article engaging member and the conveyor plate slidingly engage one another.

3. The apparatus of claim 1, wherein the article engaging member comprises a first sliding element and the conveyor plate comprises a second sliding element; wherein the first and second sliding elements are configured to slidingly interface with one another such that the conveyor plate and the article engaging member can slidingly engage one another.

4. The conveying apparatus of claim 2, wherein the cantilever arm and the detent are positioned and dimensioned such that the cantilever arm is inwardly displaced with respect to the locking surface and away from the corresponding contact surface as the conveyor plate slidingly engages the article engaging member.

5. The apparatus of claim 1, wherein means for receiving the detent comprises one of the following: a depression, an aperture, a slot, a groove, a recess.

6. The apparatus of claim 3, wherein the first sliding element comprises an elongated key and the second sliding element comprises a groove that is configured to receive the key.

7. The apparatus of claim 1, wherein at least one of the cantilever arm, the detent, and means for receiving are integral to the article engaging member.

8. The apparatus of claim 2, wherein the locking surface is defined by a base wall of the article engaging member.

9. The conveying apparatus of claim 3, wherein a portion of the article engaging member defines a locking surface;
a portion of the conveyor plate defines a corresponding contact surface that is in contact with the locking surface as the article engaging member and the conveyor plate slidingly receive one another; and
the locking surface is defined by the first sliding element and the corresponding contact surface is defined by the second sliding element.

10. The conveying apparatus of claim 2, wherein the cantilever arm is disposed in the portion of said one of said article engaging member and said conveyor plate that defines the locking surface.

11. The conveying apparatus of claim 2, wherein the cantilever arm is defined at least in part by a channel that extends through the portion of the article engaging member that defines the locking surface.

12. The apparatus of claim 1, wherein the article engaging member is a lug for engaging articles carried on a series of conveyor plates.

13. The apparatus of claim 1, wherein the article engaging member and the conveyor plate slidingly engage one another such that sliding movement of the article engaging member relative to the conveyor plate brings the detent into registration with means for receiving the detent to secure the position of the article engaging member relative to the conveyor plate.

14. An apparatus for conveying articles, comprising:
an article engaging member;
a conveyor plate that defines a support surface for supporting said articles and slidingly engages said article engaging member which extends outwardly from said support surface to engage said articles; and
a locking mechanism for substantially fixing the position of the article engaging member relative to the conveyor plate, the locking mechanism comprising:
a displaceable cantilever arm integrally formed with said article engaging member;
a detent; and
means for receiving the detent;
wherein one of the detent and said means for receiving is integral to the cantilever arm and the other of the detent and said means for receiving is integral to the conveyor plate.

15. A conveying apparatus, comprising:
an article engaging member that defines a locking surface;
a conveyor plate that slidingly engages said article engaging member, the conveyor plate defining a contact surface; and
a locking mechanism for substantially fixing the position of the article engaging member relative to the conveyor plate, the locking mechanism comprising:
a displaceable cantilever arm integrally formed with said article engaging member;
a detent; and
means for receiving the detent;

wherein one of the detent and said means for receiving is integral to the cantilever arm and the other of the detent and said means for receiving is integral to the conveyor plate; and wherein the detent protrudes from one of the locking surface and the contact surface when the detent is received by said means for receiving.

16. The conveying apparatus of claim 15:

wherein the detent is integral to the conveyor plate and protrudes from the corresponding contact surface.

17. A lug for engaging articles conveyed on a series of conveyor plates, said lug being slidingly and detachably mountable to one of said conveyor plates, comprising:

an flexibly displaceable cantilever arm integrally formed with said lug;

a substantially planar locking surface defined by said lug;

a detent integrally formed with said cantilever arm, said detent extending outwardly beyond said locking surface so as to inwardly displace said cantilever arm as said lug is slidingly mounted to said one of said conveyor plates and so as to extend beyond said locking surface when engaged by means for receiving said detent, said means for receiving being formed in said one of said conveyor plates.

18. The lug of claim 17, wherein said means for receiving the detent comprises one of the following: a depression, an aperture, a slot, a groove, a recess.

19. The conveying apparatus of claim 15:

wherein the detent is integral to the cantilever arm and protrudes from the corresponding locking surface.

* * * * *